United States Patent
Curtis et al.

(10) Patent No.: US 8,088,477 B2
(45) Date of Patent: *Jan. 3, 2012

(54) COMPOSITE COATED/ENCAPSULATED WOOD PRODUCTS AND METHODS TO PRODUCE THE SAME

(76) Inventors: Barry J. Curtis, Sandown, NH (US); Robert W. Beckwith, Cummaquid, MA (US); Richard Neisius, Centerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/358,151

(22) Filed: Jan. 22, 2009

(65) Prior Publication Data

US 2009/0130426 A1    May 21, 2009

Related U.S. Application Data

(63) Continuation of application No. 11/618,306, filed on Dec. 29, 2006, now Pat. No. 7,488,530, which is a continuation of application No. 10/716,392, filed on Nov. 17, 2003, now Pat. No. 7,175,905.

(51) Int. Cl.
*B32B 27/08* (2006.01)
*B29D 7/01* (2006.01)

(52) U.S. Cl. ............ 428/319.3; 428/319.7; 428/316.6; 428/317.9; 428/71; 428/76; 264/45.9; 264/41

(58) Field of Classification Search ............ 428/316.6, 428/317.9, 319.3, 319.7, 71, 76; 264/41, 264/45.9

See application file for complete search history.

(56) References Cited

U.S. PATENT DOCUMENTS

| | | | |
|---|---|---|---|
| 4,044,184 A | 8/1977 | Ashida et al. | 428/113 |
| 4,181,764 A | 1/1980 | Totten | 428/155 |
| 4,472,545 A | 9/1984 | Coughlin et al. | 524/13 |
| 4,565,856 A * | 1/1986 | Trotz et al. | 526/265 |
| 4,913,972 A * | 4/1990 | Grunewalder et al. | 428/425.5 |
| 5,153,058 A * | 10/1992 | Hall et al. | 428/319.7 |
| 5,759,660 A | 6/1998 | Coulis | 428/76 |
| 5,866,264 A | 2/1999 | Zehner et al. | 428/481 |
| 5,979,131 A * | 11/1999 | Remmele et al. | 52/309.9 |
| 6,103,791 A | 8/2000 | Zehner | 524/13 |

(Continued)

FOREIGN PATENT DOCUMENTS

DE        29 10 595        9/1980

(Continued)

OTHER PUBLICATIONS

International Search Report and Written Opinion of the International Searching Authority, International Application No. PCT/US2004/036559, Apr. 16, 2005.

*Primary Examiner* — Hai Vo
(74) *Attorney, Agent, or Firm* — Sunstein Kann Murphy & Timbers LLP

(57) ABSTRACT

Composite coated wood products, and methods to produce such products, are described by embodiments of the invention. Composite layers may comprise polymer and fillers, such as organic fillers and inorganic fillers. The composite layers may also be foamed in some embodiments of the invention. Such composite coated wood products may be structural or non-structural pieces that may provide safe, economical, easy to manufacture construction products that may be utilized with wood composites, and other plastic composites. Such products may also promote uniformity of appearance in objects constructed with the composite coated wood products in a variety of applications.

13 Claims, 2 Drawing Sheets

U.S. PATENT DOCUMENTS

| | | | |
|---|---|---|---|
| 6,231,994 B1 | 5/2001 | Totten | 428/537.1 |
| 6,260,328 B1 | 7/2001 | Fowler et al. | 52/834 |
| 6,309,492 B1 | 10/2001 | Seidner | 156/94 |
| 6,336,265 B1 | 1/2002 | Niedermair | 29/460 |
| 6,337,138 B1 | 1/2002 | Zehner et al. | 428/511 |
| 6,357,197 B1 | 3/2002 | Serino et al. | 52/834 |
| 6,498,205 B1 | 12/2002 | Zehner | 524/14 |
| 6,579,605 B2 | 6/2003 | Zehner | 428/319.9 |
| 6,590,004 B1 | 7/2003 | Zehner | 521/84.1 |
| 6,780,359 B1 | 8/2004 | Zehner et al. | 264/115 |
| 6,784,216 B1 | 8/2004 | Zehner et al. | 521/84.1 |
| 6,784,230 B1 | 8/2004 | Patterson et al. | 524/13 |
| 6,787,245 B1 | 9/2004 | Hayes | 428/480 |
| 6,958,185 B1 | 10/2005 | Zehner | 428/317.9 |
| 6,971,211 B1 | 12/2005 | Zehner | 52/518 |
| 6,984,445 B1 * | 1/2006 | Yamagata et al. | 428/309.9 |
| 7,034,072 B2 * | 4/2006 | Milic | 524/501 |
| 7,175,905 B2 * | 2/2007 | Curtis et al. | 428/338 |
| 7,186,457 B1 | 3/2007 | Zehner et al. | 428/326 |
| 7,488,530 B2 * | 2/2009 | Curtis et al. | 428/338 |
| 2002/0018907 A1 * | 2/2002 | Zehner | 428/537.1 |
| 2004/0148965 A1 | 8/2004 | Hutchison et al. | 62/630 |

FOREIGN PATENT DOCUMENTS

| | | |
|---|---|---|
| EP | 0 522 240 A2 | 1/1993 |
| JP | 01049636 | 2/1989 |
| JP | 2001252960 | 9/2001 |

* cited by examiner

COMPOSITE COATED/ENCAPSULATED WOOD PRODUCTS AND METHODS TO PRODUCE THE SAME

RELATED U.S. APPLICATIONS

The present application is a continuation application of U.S. patent application Ser. No. 11/618,306 filed on Dec. 29, 2006, which is a continuation application of U.S. patent application Ser. No. 10/716,392, filed on Nov. 17, 2003 and issued Feb. 13, 2007 as U.S. Pat. No. 7,175,905. The foregoing patent and all of the foregoing applications are hereby incorporated by reference herein in their entireties.

TECHNICAL FIELD

The present invention relates to composite materials for use with wood products, and more particularly to coating wood-based substrates with a composite mixture.

BACKGROUND ART

Composites are gaining market share in non-structural applications such as decking, fencing, docks, siding, playground equipment, etc. Consumers utilize plastic wood composites since they offer the advantages of a maintenance free aspect and safety from chemical exposure, vis-à-vis pressured treated lumber. Consumers, however, must still use natural wood products in constructing portions of a deck, fence, etc since a cost effective structural wood composite having appropriate strength is not available as a structural member. Thus, as much as a third of a deck is still made with pressure treated lumber. As a result, the deck still requires maintenance, has a non-uniform appearance, and still exposes deck users to leaching chemicals.

It is known to cover a wood product or substrate with a solid layer of polymer (e.g., polyethylene or polyvinyl chloride) to protect the wood, or to provide a maintenance free component in a fence system. Totten, U.S. Pat. Nos. 4,181, 764 and 6,231,994, provides for a thermoplastic covered wooden workpiece and rail. The use of the product in fence construction leads to a very "plastic" look. Fowler et al., U.S. Pat. No. 6,260,328, provides for a pre-formed protective sleeve that receives a wood structural member. This product is extruded separately and subsequently placed on dimensional lumber pieces. The product is not a composite, does not have a wood like appearance, and is high in cost due to being constructed of 100% polymer.

SUMMARY OF THE INVENTION

In one embodiment of the invention, a composite coated wood construction product is revealed. The composite coated wood construction product includes a wood-based substrate; and a composite layer coating a surface of the wood-based substrate, wherein the composite layer includes a polymer and an organic filler. The composite coated wood construction product may be a structural wood construction product, and may encapsulate the wood-based substrate.

In another embodiment of the invention, the composite coated wood construction product includes a composite layer, wherein the composite layer includes an inorganic filler. The inorganic filler may be at least one of talc, calcium, mica, clay, nanocomposite material, or flyash, and the combination of all inorganic fillers may be substantially between 5% and 35% by weight of the composite layer.

Embodiments of the invention include a composite coated wood construction product, wherein the organic filler is at least one of saw dust, wood flour, wood fibers, by products of paper manufacturing, and recycled cellulosics. The organic filler may also be an agro-fiber. Agro-fibers may be one of rice hulls, wheat shaft, flax, sugar cane, peanut shells, kenaf, and coconut shells. The combination of all organic fillers is substantially between 20% and 80% by weight of the composite layer in a preferred embodiment of the invention, and is substantially between 30% and 60% by weight of the composite layer in an especially preferred embodiment.

Polymers that may be used with embodiments of the invention may include at least one of polyethylene, polypropylene, polystyrene, ABS, polyvinyl chloride, and polyester. The polymer may also be an interpolymer.

Other embodiments of the invention are directed toward composite coated wood construction products, wherein the composite layer is foamed. Such embodiments may include a chemical blowing agent or a physical blowing agent. Preferred embodiments may also include a foamed composite layer having substantially between 5% and 80% less weight than an unfoamed composite layer with substantially the same volume as the foamed composite layer. Other preferred embodiments may include a foamed composite layer having substantially between 10% and 50% less weight than an unfoamed composite layer with substantially the same volume as the foamed composite layer.

Composite layers consistent with some embodiments of the invention may also include an additive to increase the strength of the composite coated wood construction product, or at least one of a crosslinking agent, a compatibilizers, a colorant, and a processing aid. The composite layer may also include a biocide.

Wood-based substrates that may be used with some embodiments of the invention include dimensional lumber; milled shapes; or one of solid wood, compressed wood, and particle board. The wood-based substrate may also be treated with a protecting agent.

Alternative embodiments of the invention are directed toward a composite coated wood construction product that further includes at least one additional layer. The additional layer may be an adhesive; the adhesive may be an extruded layer. The additional layer may be foamed.

A composite layer may have a total thickness substantially between 0.005 inches and 0.500 inches thick in a preferred embodiment, and a total thickness substantially between 0.5 inches and 3.0 inches thick in another preferred embodiment.

Embodiments of this invention are also directed toward composite coated wood construction products that include a wood-based substrate; and a composite layer coating a surface of the wood-based substrate, wherein the wood construction product has an exterior surface substantially the same as an exterior surface of a non-structural plastic composite.

Further embodiments of the invention are directed toward methods of manufacturing a composite coated wood construction product. The methods include the steps of coating a surface of a wood-based substrate with a layer of a composite melt; and cooling the layer of composite melt, wherein the composite melt includes a polymer and an organic filler. The step of coating may include altering a portion of a surface of the composite melt layer to create texture on the surface. The step of coating may also include extruding the layer of composite melt. As well, extruding the layer of composite melt may include extruding the layer of composite melt using at least one of a single screw extruder, a twin screw extruder, a tandem extruder, and a continuous mixer/extruder combination. Extruding the layer of composite melt may also include the steps of feeding the composite melt into a first entrance of a cross head die; and feeding the wood-based substrate to a second entrance of the cross head die. Extruding the layer of composite melt may also include the step of coextruding an additional layer; coextruding the additional layer may also include foaming the additional layer. The additional layer may be a tie layer between the layer of composite melt and the wood-based substrate. Another step that may be added to the method includes foaming the layer of composite melt.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Composite layers, used with some embodiments of the invention, may protect a wood-based substrate from environmental attack by dry rot, insects, fungal growths, and other sources. In addition, the composite layers may provide a maintenance free surface with an appearance corresponding to a particular wood composite product. The composite layer may be a tight, form-fitting coat over a wood-based substrate that provides a composite coated wood construction product that looks, feels, and handles like standard wooden profiles. The composite layer may also prevent chemicals from a wood-based substrate from escaping, and thus limiting human exposure to potentially dangerous materials. Composite coated wood construction products according to some embodiments of the invention may be used in a variety of applications including decking, fencing, docks, plastic panels, stall separators, furniture, pallets, industrial and consumer packaging, lumber replacement products, consumer, commercial, industrial, agricultural and marine building products.

Figure 1:
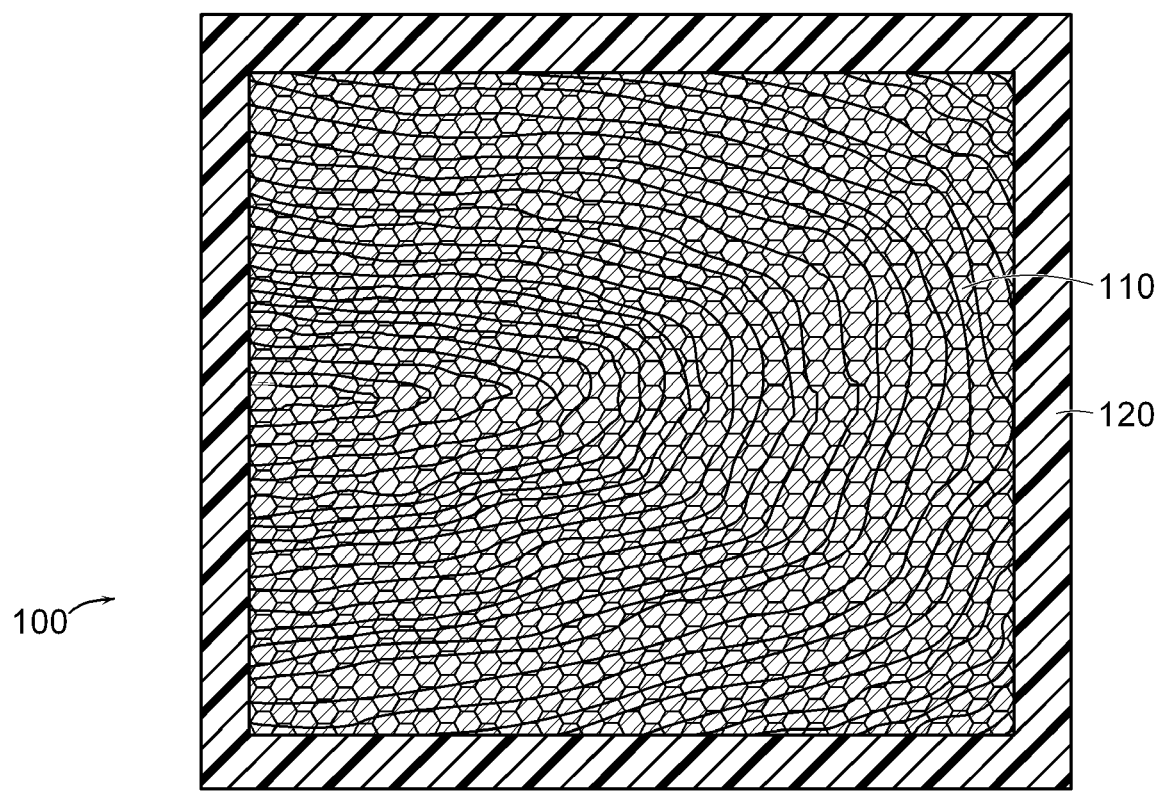
FIG. 1 is a cutaway cross sectional view of a composite coated wood construction product in accord with an embodiment of the invention.

In a first embodiment of the invention, a composite coated wood construction product is provided, a cross-sectional view of which is depicted in FIG. 1. The composite coated wood construction product 100 includes a wood-based substrate 110 and a composite layer 120 that coats a surface of the wood-based substrate. The composite layer may include polymer and one or more fillers. In particular, a filler may be one or more organic fillers, inorganic fillers, or any combination of organic and inorganic fillers. Fillers used in composite layers, in accord with some embodiments of the invention, may decrease the cost of producing composite layers, and may reinforce the strength or toughness of the composite layer.

In coating the surface of a wood-based substrate, the composite layer provides a tight, form-fitting coat that may cover a portion of a surface of the wood-based substrate, or may encapsulate the wood-based substrate, in some embodiments of the invention. Encapsulation may be either complete or partial. When the wood-based substrate is partially encapsulated, exposed portions of the substrate may be covered or capped with various materials such as plastics, composites, caulking, or other coverings. The composite layer may coat the wood-based substrate with or without adhering to the surface, and may or may not contact the wood-based substrate directly. Alternatively, one or more intermediate layers may exist between the composite layer and the wood-based substrate. Non-limiting examples of intermediate layers include other composite layers or an adhesive layer, which may attach the wood-based substrate to the composite layer. The thickness of the composite layer utilized with some embodiments of the invention may be varied according to the desires of manufacturers and requirements of applications, using techniques well known to those skilled in the art. In some preferred embodiments, the thickness of the composite layer is substantially between 0.005 inches and 0.500 inches; a composite layer of this thickness may be especially useful in applications that include decking and fencing. In other preferred embodiments, the thickness of the composite layer is substantially between 0.5 inches and 3.0 inches; a composite layer of this thickness may be especially useful in applications that include large structures (e.g., pier decks and structural bulkheads).

Wood-based substrates that may be used with embodiments of the invention may include structural and non-structural wood-based substrates used in construction, as well as dimensional lumber (e.g., profile, sheet, and plank) and milled shaped profiles. Wood-based substrates may utilize all available types of lumber, in various forms and compositions. Lumber types include, but are not limited to, pine, oak, cedar, maple, and redwood. Wood-based substrates may be treated with a protecting agent for decay resistance using established formulations (e.g., CCA, a pressurized solution of copper, chromates, and arsenic) or new formulations (e.g., ACQ, a pressurized solution of ammoniacial copper quaternary). Treated wood is typically pressure treated and dried prior to being treated, but other treating techniques may be used prior to coating the wood with a composite layer. Oriented strand board (OSB), medium density fibreboard (MDF), particleboard, plywood, compressed wood, and other manufactured wood products may also be used as a wood-based substrate. Wood-based substrates also include substrates of wood mixed with other non-wood additives.

Polymers for use with the composite layer may include the use of available commodity and engineering grade polymers. Non-limiting examples include polyethylene, polypropylene, polystyrene, polyester, polyvinyl chloride, acrylonitrile butadiene styrene (ABS), and blends and copolymers thereof. In addition, polymers such as ethylene styrene interpolymers, and other interpolymers, may be utilized. Additives may be added to the polymer to enhance polymer melt strength, product strength, the composite's ability to be processed (e.g., flow properties, or ease of homogenization and mixing of components), appearance, or to tailor other polymer characteristics, as known to those skilled in the art. Some examples of additives include cross-linking agents, compatibilizers, other resins, colorants, and processing aids. The amount of polymer in the composite layer will vary based on the properties desired but will typically be, but not limited to, 20% to 95% by weight of the total composite composition.

Organic fillers that may be utilized with the composite layer include any suitable organic material to provide the composite layer with a desired appearance or property. Organic fillers may include wood-based materials or agro-fiber materials. Some examples of organic fillers include sawdust, wood flour, wood fibers, rice hulls, wheat shaft, flax, sugar cane, peanut shells, kenaf, coconut shells, by products of paper manufacturing, and recycled cellulosics. The weight fraction of the composite layer that is organic filler varies depending upon the properties desired. In a preferred embodiment of the invention, the organic filler is substantially between 20% and 80% by weight of the composite layer. In a more preferred embodiment of the invention, the organic filler is substantially between 30% and 60% by weight of the composite layer.

In an alternate embodiment of the invention, the composite layer is foamed, i.e., entrained with a network of cells (discrete, connected, or a combination of both) formed by blowing agents. Foaming the composite layer may allow the composite layer to have the same appearance as the unfoamed composite layer, but the foamed composite layer may have one or more of the advantages of greater impact resistance; decreased cost of materials since less solids are used; decreased cost of production because of a faster production rate; and improved product utility in terms of ability to be fabricated, cut, nailed, and screwed. The composite layer may be foamed by introducing one or more physical blowing agents, chemical blowing agents, or any combination of physical and chemical blowing agents to the composite formulation. Non-limiting types of blowing agents include atmospheric gases (e.g., nitrogen or carbon dioxide), hydrocarbons (e.g., isobutanes or pentanes), hydrochlorofluorocarbons (e.g., 134 or 152), chemical agents (e.g., sodium bicarbonate or azo), and combinations thereof. A nucleating additive may optionally be used with the composite formulation.

In a related alternate embodiment of the invention, the polymer and other components of the composite layer are heated, melted and introduced into an extruder and brought to a homogenized molten state, where gas at a high pressure is introduced and mixed into the melt. The melt is cooled to a predetermined exit temperature and pressure before entering the forming die where the form is established at the die exit at atmospheric pressure. If a nucleating additive is part of the composite formulation, the additive forms sites for the gas to form a cellular matrix structure in the polymer at this point in the process. The composite is then cooled and shaped over the wood-based substrate to form the foamed composite encapsulation layer. The degree of weight reduction may be controlled in the composite layer by altering or modifying the type of polymer, amount of gas, gas type, amount and type of nucleating additive, and expansion at the die. In a particular alternate embodiment of the invention, a foamed composite layer has substantially between 5% and 80% less weight than an unfoamed composite layer with substantially the same volume as the foamed composite layer. In a preferred particular alternate embodiment, the foamed composite layer has substantially between 10% and 50% less weight than an unfoamed composite layer with substantially the same volume as the foamed composite layer.

In another embodiment of the invention, the composite layer includes one or more inorganic fillers. Inorganic fillers include any inorganic materials that may be combined with the other components of the composite layer to achieve a property for the entire composite layer (e.g., strength, toughness, unit weight, and appearance). Inorganic fillers may also act as a bulking agent to reduce the cost of a composite layer. Some examples of inorganic fillers include talc, calcium, mica, clay, nanocomposite materials, and flyash. Though the amount of inorganic filler utilized varies depending upon the desired properties of the composite layer, in a particular embodiment, the combined inorganic fillers are substantially between 5% and 35% by weight of the composite layer.

Embodiments of the invention may also include the use of other materials in the composite layer to alter the properties of the composite layer. For example, a biocide may be included in the composite layer to prevent bacteria, fungi, and other biological organisms from attacking and attaching to the composite layer.

In other embodiments of the invention, the composite coated wood construction product may further include one or more additional layers. Additional layers may be positioned between the composite layer and the wood-based substrate, or on the external surface of the composite layer. Additional layers include any type of composite layer known to those skilled in the art; additional layers may be composed of plastics (pure or mixed), mixed composites, or other materials to alter to properties of the wood construction product. For example, an additional layer may be an adhesive used to attach the composite layer to the wood-based substrate (e.g., a tie layer). Additional layers may be produced by a coextrusion process in conjunction with the application of the composite layer that is extruded. Additional layers may also be a foamed composite layer, as known to those skilled in the art or in accord with embodiments of the present invention described herein.

In another embodiment of the invention, a composite coated wood construction product is provided that includes a wood-based substrate, and a composite layer coating a surface of the wood-based substrate, wherein the wood construction product has an exterior surface that is substantially the same as an exterior surface of a non-structural plastic composite. Plastic composites include wood composites. The composite layer may be formulated using any of the techniques described herein. Thus, the composite coated wood construction product may be tailored to substantially match other wood composite products, providing a uniform appearance when used in various construction applications (e.g., fencing or decking).

Other embodiments of the invention are directed toward methods of producing the composite coated wood construction products described herein. Such an embodiment may include the steps of coating a surface of a wood-based substrate with a layer of composite melt, and cooling the layer of composite melt, wherein the composite melt includes polymer and a filler, such as an organic filler.

Figure 2:
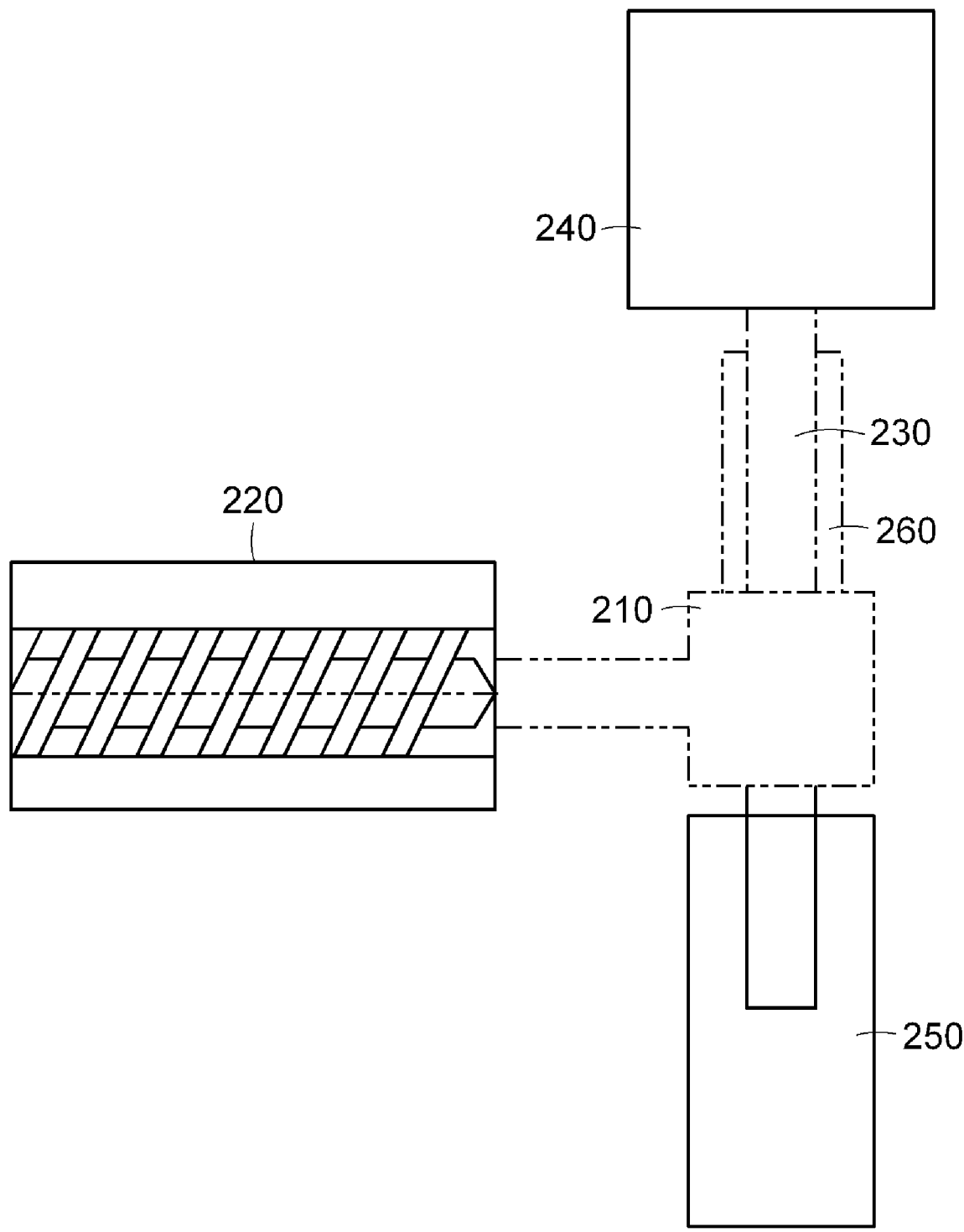
FIG. 2 is a side plan view of a process for producing a composite coated wood construction product in accord with an embodiment of the invention.

In another embodiment of the invention, the step of coating may include extruding the layer of composite material. Such embodiments may incorporate the use of feeding systems, extruders, a crosshead die, proper die lip configuration, cooling apparatus, and take off equipment designed as needed for the particular shape and coating. An example of such embodiments is depicted in FIG. 2. Equipment may be designed appropriately, as known by those skilled in the art, if the composite is foamed. Composite melt, at a desired melt temperature and pressure, with appropriate fillers, and blowing agents if desired, are fed to a die 210 from an extrusion process 220. In the die, the melt is distributed into the shape of the finished product and is extruded through die lips appropriately designed for the composite, blowing agent and product. The die may incorporate high or low pressure coating methods as necessary, including direct contact and sleeve-type techniques. A vacuum may be used as required to aid in forming the composite to the lumber product. The lumber product 230 feeds through the cross head die 210, aided by infeed guides 260, from conveying/feeding equipment 240, and is coated with the composite material. The composite melt exits the die. If the composite is foamed, a pressure drop allows for the gas to expand the wall of the plastic coating to the desired thickness and density. The product then feeds into the appropriate cooling apparatus, finishing and take away system 250.

The extruder portion 220 of the process may utilize single screw extruders, twin screw extruders, tandem extruders and continuous mixer/extruder combinations as appropriate to process the required foamed product and materials. The above extruder and continuous mixer/extruder combinations may process the composite, blowing agents, fillers accordingly and provide pressure generation to feed material to the die 210 for proper product extrusion. Other appropriate hardware (including, for example, gear pumps, screen changers, and static mixers) may be incorporated for proper processing as necessary.

Methods in accord with some embodiments of the invention may also include one or more steps of coextruding a tie layer, inline coating, lamination, or coextruding or applying one or more additional layers. Such layers or coats may be positioned between the wood-based substrate and composite melt layer, or positioned adjacent with the composite layer and exposed to the environment.

Other embodiments of the invention include processing steps that alter a portion of the exterior surface texture of the composite layer after the wood-based substrate is coated with the composite layer. Some examples of such processing steps include embossing the composite surface, brushing the surface, skinning using air, water, or skinning plates. Other finishing techniques known to those skilled in the art may also be utilized.

It is understood that the present invention is not to be limited by the embodiments of the invention described herein. Indeed, those skilled in the art will readily understand that various modifications and embodiments of the invention may be made and practiced without departing from the scope of the invention.

Example

The following example is provided to illustrate an embodiment of the invention. The example is not intended to limit the scope of any particular embodiment, or the practice of the invention itself.

The following formulation presents the components of a mixture that may be used to make a foamed composite layer, in accord with an embodiment of the invention. The percentages are given on a weight basis of total amount of raw materials before they are processed.

| | |
|---|---|
| high density polyethylene 0.7 MI | 42.3% |
| wood fibers | 53.3% |
| azo (chemical blowing agent) | 0.2% |
| $CO_2$ | 0.2% |
| colorant/UV stabilizers | 4.0% |

What is claimed is:

1. A composite-coated structural wood construction product for use as structural support in a deck comprising:
   a natural wood substrate;
   an intermediate composite layer coating directly on a surface of the substrate; and
   an outer composite layer coating the intermediate composite layer, wherein the intermediate composite layer is foamed and includes a polymer and an inorganic filler wherein the polymer is polyvinyl chloride, wherein the combination of all inorganic fillers is substantially between 5% and 35% by weight of the intermediate composite layer,
   wherein the intermediate and outer composite layers encapsulate the wood substrate,
   wherein the outer composite layer has an exterior surface substantially the same as an exterior surface of a non-structural plastic composite, and
   wherein the intermediate layer and the outer layer are extruded.

2. A composite-coated structural wood construction product for use as structural support in a deck comprising:
   a natural wood substrate;
   an intermediate composite layer coating directly on a surface of the substrate; and
   an outer composite layer coating the intermediate composite layer, wherein the intermediate composite layer is foamed and includes a polymer and an inorganic filler wherein the polymer is polyethylene, wherein the combination of all inorganic fillers is substantially between 5% and 35% by weight of the intermediate composite layer,
   wherein the intermediate and outer composite layers encapsulate the wood substrate,
   wherein the outer composite layer has an exterior surface substantially the same as an exterior surface of a non-structural plastic composite, and
   wherein the intermediate layer and the outer layer are extruded.

3. A composite-coated structural wood construction product for use as structural support in a deck comprising:
   a natural wood substrate;
   an intermediate composite layer coating directly on a surface of the substrate; and an outer composite layer coating the intermediate composite layer, wherein the intermediate composite layer is foamed and includes a polymer and an inorganic filler wherein the polymer is polypropylene, wherein the combination of all inorganic fillers is substantially between 5% and 35% by weight of the intermediate composite layer,
   wherein the intermediate and outer composite layers encapsulate the wood substrate,
   wherein the outer composite layer has an exterior surface substantially the same as an exterior surface of a non-structural plastic composite, and
   wherein the intermediate layer and the outer layer are extruded.

4. A composite-coated structural wood construction product for use as structural support in a deck comprising:
   a natural wood substrate;
   an intermediate composite layer coating directly on a surface of the substrate; and
   an outer composite layer coating the intermediate composite layer,
   wherein the intermediate composite layer is foamed and includes a polymer and an inorganic filler wherein the polymer is polystyrene, wherein the combination of all inorganic fillers is substantially between 5% and 35% by weight of the intermediate composite layer,
   wherein the intermediate and outer composite layers encapsulate the wood substrate,
   wherein the outer composite layer has an exterior surface substantially the same as an exterior surface of a non-structural plastic composite, and
   wherein the intermediate layer and the outer layer are extruded.

5. A composite-coated structural wood construction product for use as structural support in a deck comprising:
   a natural wood substrate;

an intermediate composite layer coating directly on a surface of the substrate; and an outer composite layer coating the intermediate composite layer, wherein the intermediate composite layer is foamed and includes a polymer and an inorganic filler wherein the polymer is polyester, wherein the combination of all inorganic fillers is substantially between 5% and 35% by weight of the intermediate composite layer, wherein the intermediate and outer composite layers encapsulate the wood substrate, wherein the outer composite layer has an exterior surface substantially the same as an exterior surface of a non-structural plastic composite, and wherein the intermediate layer and the outer layer are extruded.

6. A composite-coated structural wood construction product for use as structural support in a deck comprising:

a natural wood substrate;

an intermediate composite layer coating directly on a surface of the substrate; and an outer composite layer coating the intermediate composite layer, wherein the intermediate composite layer is foamed and includes a polymer and an inorganic filler wherein the polymer is acrylonitrile butadiene styrene, wherein the combination of all inorganic fillers is substantially between 5% and 35% by weight of the intermediate composite layer, wherein the intermediate and outer composite layers encapsulate the wood substrate, wherein the outer composite layer has an exterior surface substantially the same as an exterior surface of a non-structural plastic composite, and wherein the intermediate layer and the outer layer are extruded.

7. A method of preparing a composite-coated structural wood construction product for use as structural support in a deck comprising:

providing a natural wood substrate;

extruding an intermediate composite layer directly over the substrate; and extruding an outer composite layer over the intermediate composite layer, wherein the intermediate composite layer is foamed and includes a polymer and an inorganic filler wherein the polymer is selected from the group consisting of polyvinyl chloride, polyethylene, polypropylene, polystyrene, polyester and acrylonitrile butadiene styrene, wherein the combination of all inorganic fillers is substantially between 5% and 35% by weight of the intermediate composite layer, and wherein the intermediate and outer composite layers encapsulate the wood substrate, wherein the outer composite layer has an exterior surface substantially the same as an exterior surface of a non-structural plastic composite.

8. A method according to claim 7, wherein the polymer is polyvinyl chloride.

9. A method according to claim 7, wherein the polymer is polyethylene.

10. A method according to claim 7, wherein the polymer is polypropylene.

11. A method according to claim 7, wherein the polymer is polystyrene.

12. A method according to claim 7, wherein the polymer is polyester.

13. A method according to claim 7, wherein the polymer is acrylonitrile butadiene styrene.

* * * * *